United States Patent [19]

Gantt et al.

[11] Patent Number: 5,358,120
[45] Date of Patent: Oct. 25, 1994

[54] SELECTIVE SEPARATION OF FINELY-DIVIDED MINERALS BY ADDITION OF SELECTIVE COLLECTOR REAGENT AND CENTRIFUGATION

[75] Inventors: George E. Gantt, Milledgeville; Thomas J. Adkisson, Macon; Preston B. Gladin, Milledgeville; Randall E. Ussery, Jr., Gordon, all of Ga.

[73] Assignee: Engelhard Corporation, Iselin, N.J.

[21] Appl. No.: 215,214

[22] Filed: Mar. 21, 1994

Related U.S. Application Data

[63] Continuation of Ser. No. 988,393, Dec. 9, 1992, Pat. No. 5,311,997, which is a continuation of Ser. No. 725,713, Jul. 3, 1991, abandoned.

[51] Int. Cl.$^5$ ............ B03B 1/04; B03B 7/00; B04C 9/00
[52] U.S. Cl. ............ 209/4; 209/5; 209/9; 209/47; 106/486; 106/487; 501/149; 494/37
[58] Field of Search ............ 209/4, 5, 9, 10, 12, 209/47, 211; 106/486, 487, 488; 501/145, 147, 148, 149; 494/37

[56] References Cited

U.S. PATENT DOCUMENTS

| | | |
|---|---|---|
| 2,894,628 | 7/1959 | Duke . |
| 2,990,958 | 7/1961 | Greene . |
| 3,107,214 | 10/1963 | Duke . |
| 3,224,582 | 12/1965 | Iannicelli . |
| 3,253,791 | 5/1966 | Cohn . |
| 3,331,505 | 7/1967 | Mercade . |
| 3,371,988 | 3/1968 | Maynard . |
| 3,425,546 | 2/1969 | Duke . |
| 3,432,030 | 3/1969 | Olivier . |
| 3,464,634 | 9/1969 | Brociner . |
| 3,536,264 | 10/1970 | Helton . |
| 3,635,337 | 1/1972 | Mercade . |
| 3,659,708 | 5/1972 | Morris . |
| 3,670,883 | 6/1972 | Weir . |
| 3,701,417 | 10/1972 | Mercade . |
| 3,737,333 | 6/1973 | Sawyer . |
| 3,862,027 | 1/1975 | Mercade . |
| 3,868,318 | 2/1975 | Clark . |
| 3,879,283 | 4/1975 | Mercade . |
| 4,014,709 | 3/1977 | Dykstra . |
| 4,018,673 | 4/1977 | Hughes . |
| 4,472,271 | 9/1984 | Bacon . |
| 4,492,628 | 1/1985 | Young . |
| 4,604,369 | 8/1986 | Shi . |

FOREIGN PATENT DOCUMENTS 104099  3/1984  European Pat. Off. .

Primary Examiner—Thomas M. Lithgow
Attorney, Agent, or Firm—I. L. Moselle

[57] ABSTRACT

Separation of impurities from kaolin clay is accomplished by conditioning a dispersed aqueous pulp of the clay with an anionic flotation collector, followed by centrifugation or the like to cause the impurities to settle from a dispersed pulp of the clay without an intermediate froth flotation step or a flotation waste froth is centrifuged or hydrocloned to recover valuable kaolin contained in the froth.

5 Claims, No Drawings

SELECTIVE SEPARATION OF FINELY-DIVIDED MINERALS BY ADDITION OF SELECTIVE COLLECTOR REAGENT AND CENTRIFUGATION

This is a continuation application under 37 CRF 160, of pending prior application Ser. No. 988,393 filed on Dec. 9, 1992 now U.S. Pat. No. 5,311,997, which is a continuation of Ser. No. 725,713 filed on Jul. 3, 1991, now abn. ADDITION OF SELECTIVE COLLECTOR REAGENT AND CENTRIFUGATION

1. FIELD OF INVENTION

This invention relates to the separation of finely divided minerals from other finely-divided minerals in the presence of water which utilizes reagents of the type used in differential froth flotation but does not employ a frothing step and the use of flotation cells to effect the separation. The invention relates particularly to the separation of colored titaniferous impurities from impure kaolin clay which employs augmented gravitational forces instead of froth flotation to separate impurities from the kaolin.

2. BACKGROUND OF THE INVENTION

Froth flotation has been practiced for over a century to separate mineral particles on the basis of differences in chemical composition. Early examples include the separation of sulfide minerals from oxide gangue by forming the ore into an aqueous pulp, adding a xanthate collector reagent which selectively coats one or more desired sulfide minerals from gangue, adding a frother, and subjecting the reagentized ore pulp to aeration by various means. A froth product which is a concentrate of the sulfide minerals which report as a froth which is then separated from the nonfloated gangue-rich aqueous pulp.

Froth flotation was most readily implemented when it was applied to sulfide minerals, especially those of relatively large particle size, for example, larger than 10 microns. A subsequent development was the adaptation to the selective flotation of so-called "oxidized" minerals such as cassiterite, fluorspar, scheelite and titania from other oxidized minerals using anionic (negatively charged) collectors, such as fatty acids or modified fatty acids, sometimes augmented by reagents to control selectivity and/or to control frothing. These processes were also more difficult to implement when the ore in the pulp was very finely mineralized or if the pulp contained slimes.

In all but the coarser particle size fractions of typical kaolin crudes, most of the particles are finer than 5 microns. In fact, the kaolin in the crudes usually have an average particle size (as determined by conventional sedimentation techniques) below 2 microns and frequently have a significant content of particles in the submicron-size range. Furthermore, the colored impurities (principally iron-fearing titanias) are present in small amounts, e.g., 1–5% of the weight of a degritted crude and in the form of very fine particles. Thus one of the greatest challenges in the art of froth flotation was the selective flotation of colored impurities indigenous to most kaolin clays from the kaolin particles.

The successful large-scale flotation purification of kaolins awaited the development in the 1960's of so-called "Ultraflotation", U.S. Pat. No. 2,990,958, the teachings of which are incorporated herein by cross-reference. The process achieved the flotation of colored titaniferous impurities from fine particle-size fractions of kaolin crude by utilizing several modifications of conventional froth flotation technology, including the use of a clay dispersant anionic (mixture of fatty acids and rosin acids) addition of "auxiliary," or carrier, mineral particles (calcite) amenable to flotation with an anionic collector, and oils to control frothing. In carrying out the process, the impurities and the calcite were selectively coated with the anionic collector. When the ore pulp was aerated these minerals reported in the froth which was separated on a continuous basis from the remainder, a dispersed pulp of purified kaolin was recovered. The purified clay was further processed by bleaching, filtration washing, etc. In preferred embodiment, the kaolin pulp was first degritted to remove gross particles, generally larger than 325 mesh. Following this the degritted pulp was separated into a fine and coarse particle size fraction, the fine fraction, for example a fraction 80% or 90% by weight finer than 2 microns, being the one which was "conditioned" with the collector and "carrier." The pulp thus conditioned was charged to the flotation cells where other reagents were added. A bank of flotation cells were used in the process, as is conventional in ore flotation, with the froth from one cell being diluted with water to facilitate transfer to the next cell, etc. and the machine discharge products (nonfloated material) being combined to maximize recovery of purified kaolin. The froth product was transferred to an appropriate waste disposal site.

Subsequent efforts to beneficiate kaolin clay by froth flotation include TREP, a flotation operation that can be applied to whole (unfractioned kaolin crudes) and can be operated at higher solids than Ultraflotation, TREP features the use of an oleic acid collector with a calcium salt such as calcium chloride in flotation cells in which air is introduced into a recycle stream of beneficiated clay. In this case, as in Ultraflotation, the concept of using an anionic organic collector for colored impurities such as titaniferous matter, followed by aeration and flotation is applied. See U.S. Pat. No. 4,472,271, the teachings of which are incorporated here by cross-reference.

Another variant of the anionic froth flotation purification of kaolin clay is described in U.S. Pat. No. 3,979,282 which includes an example for the removal of colored tournaline from a clay.

While many advances have been made in these schemes for removing colored impurities from kaolin clay, sometimes referred to as "china clay," most of the developments have adhered to the concept of using an anionic collector to selectivity float impurities and aeration and flotation to effect the separation. Exceptions are high intensity magnetic separation procedures, now widely used in industry, frequently in combination with froth flotation. Also, schemes have been proposed to selectively flocculate impurities from kaolin or to selectively flocculate kaolin from impurities with high molecular weight charged polymers such as polyacrylamide, followed by physical separation of flocculated matter from dispersed particles. Also, it has been proposed to permit an anionically conditioned pulp of impure kaolin to settle quiescently, whereby aeration introduced during conditioning causes impurities to float on a pulp of purified clay. The floated impurities are skimmed from the surface of the pulp of purified kaolin. See U.S. Pat. No. 3,670,883.

None of these procedures has met the widespread acceptance of froth flotation and, in the case of magnetic purification, the technique does not remove titaniferous and other very weakly paramagnetic impurities to the extent achievable by froth flotation. Thus, the froth flotation method for purifying kaolins is one of the largest commercial industrial mineral beneficiation operations in existence.

Froth flotation of kaolin is not without drawback, especially in the present industrial climate in which large scale industrial equipment such as float cells are expensive and wastage of valuable mineral resources through processing loss is of great commercial significance. Further, production of by-product waste streams must be minimized for environmental reasons. Thus, kaolin flotation as presently practiced, even in advanced modes, results in the recovery of beneficiated kaolin in the form of relatively dilute effluents, typically about 13 to 18% solids, depending upon grade, in the case of Ultraflotation and about 30 to 35% solids in the case of TREP. This means that water must be removed from the pulp of dispersed purified kaolin before further processing such as bleaching is carried out. It would be highly advantageous to achieve the high level of titania removal achievable by froth flotation while generating more concentrated streams of kaolin products. Among other obvious benefits, prolonged aging in settling tanks would be avoided, thus minimizing the amount of undesirable airborne quartz dust introduced into the clay during settling.

While there has been ongoing effort by practitioners of the technology to avoid losses of kaolin with the floated impurities, this has been unavoidable in large scale commercial operations. Thus, typical kaolin losses in Ultraflotation are about 8%, based on the weight of kaolin feed to the conditioners and are about 10% in TREP.

Kaolin products, especially premium grades such as those necessitating beneficiation, are supplied as grades, depending upon particle size and brightness criteria. Kaolin clays are polydispersed in the sense that the particles are not composed of particles of a single particle size. If they were, impurities could readily be separated from the kaolin by gravity, provided the impurities had different settling velocities. However, not only are kaolins composed of particles of widely different particle size ranges, e.g., particles as fine as 0.2 microns up to 10 microns, but the distribution of the impurities is such that Stokes law, as applied to gravity settling or even high speed centrifuges, will not separate titaniferous impurities in most kaolins to the extent achievable by froth flotation when applied to simple dispersed kaolin pulps. Thus, it is conventional practice to centrifuge kaolin feed before it is charged to flotation equipment, as in Ultraflotation, or after flotation, as in TREP to recover kaolin fractions of various sizes. The primary role of centrifugation in these operations is to produce grades of desired particle size and not primarily to purify the kaolin.

A related challenge to the kaolin industry is the physical recovery of valuable kaolin from a flotation waste before the waste is impounded in an environmentally acceptable manner. The kaolin should be recovered as a grade of desired particle size. This not only improves the recovery of valuable kaolin but reduces the volume of waste that must be handled. Waste includes titania and/or other impurities as well as organic and inorganic flotation reagents. In the case of Ultraflotation, the wastes also include substantial volumes of carrier (calcite) and other reagent used to float carrier and impurity. For example, a calcite carrier is typically used in amount of about 12 to 20% based on the weight of kaolin flotation feed. The discarded froth product typically contains about 85 to 95% calcite. See U.S. Pat. No. 4,014,709. Early in the development of Ultraflotation a proposal was made to remove the calcite carrier from a kaolin froth product by adding a powerful dispersant (TSPP) to remove reagent from carrier. Although the process did place the carrier in reusable form, it removed collector, therefore necessitating further addition of flotation oil before the material could be reused in Ultraflotation. It would be desirable when treating such a waste by-product to recover the carrier without removing flotation reagents therefrom.

SUMMARY OF THE INVENTION

We have made the unexpected discovery that dispersed kaolin obtained by flotation purification with an anionic collector reagent selective to the flotation of colored impurities in the kaolin feed can be recovered from an aqueous waste froth product including anionically reagentized impurities and occluded kaolin by subjecting the waste to gravitational force in a centrifuge or hydroclone.

We have made the further unexpected discovery that a kaolin feed pulp reagentized with an anionic collector selective to froth flotation of colored impurities can be purified without aeration and flotation simply by subjecting the reagentized pulp to sufficient gravitational force, as in a centrifuge or hydroclone, to cause the impurities to settle, whereby the purified kaolin is recovered as an overflow product without dilution instead of as a diluted underflow product as it is in froth flotation. A significant benefit, in addition to improved recovery of beneficiated kaolin product and reduced losses in the wastes, is the ability to recover the beneficiated kaolin without the need to use dilution water as required to transfer froth from cell to cell in conventional froth flotation. Further, the need to acquire, install and maintain flotation cells is avoided. The significance of being able to beneficiate without using flotation cells is best appreciated by the visitor to a flotation plant who observes the extensive capital expenditure and energy costs involved in large-scale froth flotation.

While the invention has been described with special reference to its utility in kaolin flotation, it is believed that the benefits will be realized with other flotation processes in which a finely mineralized ore pulp or a slimed pulp which is amenable to selective froth flotation in the presence of an appropriate collector. Non-limiting examples are the flotation of carbonate (e.g., calcite, magnesite), cassiterite, scheelite, and fluorspar ores using a dispersed aqueous pulp with an anionic collector to float the valued minerals from silica and silicate gangue. Using the process of the invention, the reagentized mineral, e.g., carbonate, cassiterite, scheelite or fluorspar, may be recovered as a centrifuge (or hydroclone) underflow product instead of as a floating froth.

DESCRIPTION OF PREFERRED EMBODIMENTS

In one embodiment, the charge to a centrifuge or a hydroclone is a waste product from a froth flotation process for beneficiating kaolin clay wherein the froth contains water in which is suspended an agglomerated concentrate of colored impurities originally in the kaolin, including iron-bearing titania in the case of most Georgia kaolin, and in some cases including one or more iron minerals, mica or ilmenite or tourmaline. The impurity or impurities are coated with an anionic reagent. The waste also contains dispersed particles of kaolin clay. In the case of a froth product from an Ultraflotation process, the froth will include virtually all of the calcite or other "carrier" added in the process, the calcite also being coated with the collector. Typically the collector is oleic acid, or mixtures of oleic and rosin acids. However, other anionic collectors, such as, for example, hydroxyamates, linoleic acid or sulfonated fatty acids, may constitute all or part of the collector. Residual flotation oils, such as the fuel oil employed to control froth or a petroleum sulfonate salt such as used in Ultraflotation may be present in the froth product. Small amounts of water soluble reagents used or formed in the flotation process may also be present. These include one or more anionic dispersants, typically an alum-silica hydrosol, sodium silicate, sodium carbonate, sodium polyacrylate or mixtures thereof. Soluble material in the flotation process will be concentrated in the recovered dispersed pulp of purified kaolin. Reference is made to U.S. Pat. No. 4,014,729 for a disclosure of the composition of a typical Ultraflotation waste product.

Typically pH of the froth waste is alkaline, e.g., above 8. Solids are generally above 30% by weight and are frequently higher. The solids in the froth product, at least the collector-coated solids, are in agglomerated condition, whereby they can be separated from the kaolin by centrifugation or hydroclones which will not accomplish the same virtually quantitative separation of kaolin particles from impurities if all of the particles were dispersed, as they are in conventional processes for separating mineral mixtures into fractions based on particle size. In other words the presence of flotation collector is vital to the separation to be accomplished by the invention.

In practicing the other embodiment of the invention wherein a dispersed kaolin pulp is conditioned for froth flotation but, instead of purifying the conditioned pulp in flotation cells, the pulp is charged to one or a series of centrifuges or hydroclones. In this case, frothers and reagents intended primarily to serve as frothers or froth control agents need not be present in or added to the conditioned pulp.

The teachings of the above cross-referenced patents are illustrative of reagents that can be used to disperse kaolin pulps for froth flotation and reagents and other operating conditions that are useful in the conditioning step. These patents are also referenced for their disclosures of equipment useful in the conditioning step. See also U.S. Pat. No. 4,483,624. Those skilled in the art of froth flotation will recognize that in froth flotation, conditioning is a step distinctive from aeration and flotation. Thus, the purpose of conditioning is to distribute the collector in the aqueous mineral pulp so that it will selectively coat the mineral or minerals to be floated; conditioning is not intended to introduce air bubbles, although minimal aeration during conditioning will not be detrimental. However, if formation of a strong tenacious froth occurs such as may be desired in froth flotation, this may not be desirable and is not essential.

In practice of the invention, the "G" force necessary in the operation of a centrifuge or the like can be determined by simple experimentation in which "G" is varied and the desired separation is observed. Ideally, the gravity separation will remove virtually all kaolin particles as a centrifuge (or hydroclone) overflow product and, therefore, the particle size distribution of the kaolin will be that of the feed kaolin in both embodiments of the invention. Obviously, insufficient gravitational force will not effectively separate kaolin from other materials, and excessive force will cause all solids to deposit as a solid.

The following examples are given for illustrative purposes and are not to be construed as limiting the invention unless otherwise indicated.

Conditioning for Ultraflotation, referred to in the following illustrative examples, was conducted in ten conditioning cells, 9.5 feet high, 8 foot diameter, equipped with 200 horsepower, 880 RPM agitators. Also used were three preconditioners, 5×5 foot, 5 horse motors, 1800 RPMs. Ultraflotation is carried out using sixty-eight Denver Model H5854A flotation cells with 20 horsepower 800 RPM motors. Utilization of this equipment includes sixteen rougher cells, twelve first cleaning cells, eight second cleaning cells, eight third cleaning cells, twelve recovery cells, and twelve refloat cells. Additional horsepower includes the recovery froth conditioner, 200 horsepower and the rougher froth conditioner, 200 horsepower. Other horsepower is required for pumps, paddles, etc.

Conditioning for TREP was carried out in a squirrel cage conditioner, described in U.S. Pat. No. 4,483,624.

Fractionation gravity separation equipment utilized in the following illustrative examples includes a Damon Model CU-5000 laboratory centrifuge which is capable of operating up to 6000 G's. Fractionation for experimental purposes was maintained at approximately 800 G's. Pilot scale fractionation was accomplished utilizing a Sharples solid bowl centrifuge, Pilot Plant size Type BM357A-10A, Serial No. 55P4486, capable of a maximum rotational speed of 4000 RPMs. Fractionation utilizing this equipment was controlled to simulate approximately 1200 G's. Plant scale fractionation utilized a solid bowl centrifuge manufactured by Bird Machinery Company, 40 inch diameter by 60 inch bowl, typically utilized for degritting service. The speed for the plant-scale machine was controlled to impart approximately 900 G's. Hydroclone equipment included two sizes of ceramically lined hydroclones, one operated with an 11" long pressure drop, 70 PSI, and the other with an 18" long pressure drop, 70 PSI.

The following explanation of the centrifugal acceleration appears in Perry's "Chemical Engineering Handbook," 5th Edition, Pg. 19-36.

Magnitude of Centrifugal Force. In industrial centrifuges the centrifugal acceleration is many times the gravitational acceleration. Centrifugal force, commonly expressed in multiples of the standard force of gravity, varies with the rotational speed and with the radial distance from the center of rotation. At the wall of a bowl of diameter $D_b$ the centrifugal force is given by $$F_c = 0.0000142 n^2 D_b$$

where $F_c$ is the centrifugal force, multiples of gravity n is the speed of rotation, r.p.m., and $D_b$ is the bowl diameter, in.

The Ultraflotation process and products referred to in illustrative examples used a hydrosol dispersed kaolin slip containing varying amounts of soda ash from 0 to $3\frac{1}{2}\#/T$ followed by sodium hydroxide pH adjustment, if needed, to a range between 8 and 9 is provided for the feed pulp. The hydrosol was alum-silicate based. In this operation, dispersed crude is pumped to the plant between 35 and 40% solids. After fractionation and magnetic purification, if necessary, the plant feed solids are approximately 25%. Crudes are fractionated to either 80% finer than 2 microns, 90% finer than 2 microns or 90% finer than 1 micron. The calcite carrier used in the Ultraflotation operation was ground limestone which was at least 95% −44 micron and had a surface area of 1–2 square meters per gram. The ground limestone was added to the pulp of dispersed fractionated kaolin clay at a concentration varying between 12 and 17% based on the weight of the kaolin, depending on the grade of kaolin being processed. Other reagents added during conditioning for Ultraflotation include: 2–4 pounds per ton of ammonium sulfate, 6–8 pounds per ton of a Tall oil/Calcium Petronate mix, 1–3 pounds per ton of ammonium hydroxide, 4–6 pounds per ton of Eureka oil and 1–1½ pounds per ton of fuel oil. Variations in the chemical addition result from the different grades and different characteristics of the pulp to be beneficiated.

In carrying out the TREP process, an alum-silicate hydrosol dispersed slip generally containing no soda ash is pumped to the plant at nominally a 7.5 pH. Oxone is added to the pulp for organic contaminant control in an amount between ¼ and 1 pound per ton, depending on the level of organic contamination. Adjustments in pH within the plant are performed with sodium hydroxide as required to achieve specified ranges. The collector used is oleic acid, and the quantity added varies to satisfy the requirements of the pulp particle size distribution as received. The range is 2.5–3.5 pounds per ton. Examples include variations in crude particle size between 50% and approximately 70%–2 microns. As a result of the fact that there is no fractionation process upstream of the TREP, processing solids for TREP typically do not fall below 35% and may be above 50% solids. The quantity of calcium chloride added to the TREP feed during conditioning varies between 0.75 and 2.0 pounds per ton, depending on the soluble calcium ion content of the slip. Sodium polyacrylate dispersant (C-211) is added to optimize conditioned pulp dispersion. The quantity of C-211 added varies between 0 and 2 pounds per ton as the result of variation in slip characteristics.

All weights in the examples represent oxides; thus 0.5% titanium represents 0.5% $TiO_2$.

In the examples, results from an analytical bleach procedure are reported. This is a method for determining the optimum brightness potential of a kaolin sample. The procedure removes any organic matter that may be present in the sample without using hazardous ozone by substituting potassium permanganate as the oxidant. The procedure is termed a "3/10 bleach" when the Kaolin sample is considered a "white" clay and a "5/15 bleach" when the clay is gray. The resultant bleach values when compared to the brightness obtained by conventional reductive bleaching determines the efficiency of the process to obtain the brightness potential. The procedure involves the use of excess potassium permanganate which is destroyed after the heating of the slurry by the addition of sulfur dioxide in a water solution.

EXAMPLE 1

Beneficiated Kaolin Recovery from Waste Froth

Ultraflotation waste froth from a plant operated with an ultrafine particle size feed, about 90% finer than 1 micron, was evaluated using three concepts for recovery potential. These include (a) settling, (b) centrifugation alone, and (c) screening, followed by centrifugation.

In (a), froth obtained from the float plant was allowed to settle, and the kaolin layer was decanted and analyzed. The beneficiated pulp had the following analyses:

| Titanium | .66% |
|---|---|
| Iron | .755% |
| 5/15 brightness | 90.1% |

In (b), the same froth was subjected to pilot plant centrifugation. The solids of the kaolin product recovered as a centrifuge overflow was 5.0%. The centrifuged kaolin product contained 0.712% titanium, and had a 5/15 hot bleach potential of 90.8. As a confirmation that no other impurities were present, an LOI (loss on ignition) was checked and found to be 14.5%, indicating that essentially no carbonate remained in the recovered clay product.

In (c), froth was taken from the float plant, and screened through a 325 mesh Sweco screen to separate a portion of the froth. The screened froth was fed to the Sharples pilot scale solid bowl centrifuge. The beneficiated product from the froth waste had the following characteristics:

| Particle Size | 98% − 2 microns, 90 − 1 micron |
|---|---|
| As recovered brightness | 87.2% |
| Iron | .684% |
| Titanium | .773% |
| 3/10 brightness | 90.0% |

A second evaluation of (c) was completed utilizing a centrifuge feed pump setting providing three times the feed rate of the above test. The following results were obtained:

| As is brightness | 86.9% |
|---|---|
| Iron | .686 |
| Titanium | .893% |
| 3/10 brightness potential | 89.1% |

In an additional pilot scale evaluation, similar results were obtained from a different sample of froth. The iron content was 0.642%, titanium 0.734% with a 3/10 brightness potential of 89.9.

EXAMPLE 2

Centrifuge Beneficiation of Conditioned Pulp

Conditioned but unfloated product from an Ultraflotation plant was subjected to centrifugation, utilizing a pilot plant Sharples solid bowl centrifuge. (Note that pulp obtained at this point in the process does not contain the fuel oil added for froth control.) The pulp used in this flotation operation was used to make a high brightness flotation beneficiated kaolin that is nominally 90% by weight finer than 1 micron. The following data was obtained at different settings of the positive displacement pump. (Flow is essentially proportional to the pump setting.)

| Pump Setting | % Solids | 3/10 Brightness, % | % Titanium | % Iron | % by weight finer than 2 microns |
|---|---|---|---|---|---|
| 4.0 | 22.8 | 90.1 | .645 | .666 | 89 |
| 5.5 | 23.6 | 89.9 | .679 | .682 | 88 |
| 6.5 | 23.6 | 89.7 | .671 | .684 | 88 |

As noted by the above data, a substantial amount of operational flexibility is achieved when utilizing a solid bowl centrifuge to beneficiate a conditioned product. Approximately a 50% increase in centrifuge feed rate resulted in only a small adverse effect on final product brightness potential. Another important facet of the data is the % solids of the product from the centrifuge essentially reflects no dilution when compared to float plant feed pulp solids.

EXAMPLE 3

Centrifuge Beneficiation of Conditioned Pulp

Conditioned pulp samples were obtained from the Ultraflotation plant and subjected to centrifugation. The same type of kaolin used in Example 1 was employed. Results of Ultraflotation and the process of the invention were compared.

The attached table reflects the results of the pilot scale evaluations. Note the differential in total plant TMD (total machine discharge) solids vs. the solids obtained by the new beneficiation method. Also note centrifuge conditions were varied in order to beneficiate as well as fractionate the final products between 80% and 90% finer than 2 microns. Samples subjected to the centrifuge beneficiation during one trial represent a 90% finer than 2 microns plant product (See Table 1). Included is a typical analysis, done by atomic absorption, of centrifuge processed product and the resulting underflow (impurity+carrier) from the process (See Table 2).

A sulfuric acid titration to quantify the residual calcite carrier in the centrifuge product vs. plant processed grade yielded a titre of 0.232 grams vs. 0.234 grams. This demonstrated essentially complete separation of carrier. In order to identify the impact on product viscosity, plant processed vs. centrifuge processed product from the same feed pulp were evaluated by the known Brookfield (BF) and Heliopath (HEP) procedures (See Table 3).

TABLE 1

Results of Bird Centrifugation of Conditioner Product

| Solids | PSD @ 2 | TMD Brightness | % TiO2 | % Fe | Product |
|---|---|---|---|---|---|
| 18.8 | 80 | 86.4 | 90.0 | .510 | .687 | Control** |
| 22.8 | 89 | 86.8 | 90.4 | .525 | .686 | PS-4 |
| 23.6 | 86 | 86.9 | 90.5 | .514 | .696 | PS-5 |
| 25.2 | 82 | 86.7 | 90.0 | .530 | .669 | PS-7 |
| 22.5 | 90 | 86.7 | 90.0 | .538 | .687 | PS-4 |
| 23.8 | 86 | 86.7 | 90.0 | .524 | .706 | PS-5 |
| 25.2 | 81 | 86.7 | 90.1 | .520 | .661 | PS-7 |
| 24.4 | 91 | 86.7 | 90.4 | .629 | .682 | PS-4 |
| 24.9 | 91 | 86.8 | 90.5 | .617 | .697 | PS-5 |
| 17.3 | 90 | 86.7 | 90.4 | .630 | .701 | Control |

PS = Pump setting

TABLE 2

| | Bird Centrifuge Kaolin Product Wt., % | Bird Centrifuge Underflow Product Wt., % |
|---|---|---|

TABLE 2-continued

| Kaolin | 98.6 | 21.40 |
|---|---|---|
| CaCO3 | 0.21 | 69.04 |
| TiO2 | 0.41 | 9.07 |
| Fe2O3 | 0.62 | 0.48 |

TABLE 3

| | % Solids | pH | BF | HEP | PSD @ 2 Microns |
|---|---|---|---|---|---|
| Control | 70.0 | 6.5 | 222 | 1100/5.0 | 89 |
| Centrifuged Product | 70.0 | 6.6 | 262 | 1100/4.2 | 91 |

No detrimental effect on viscosity is indicated from the above data.

EXAMPLE 4

Centrifuge Beneficiation of Conditioned Pulps (Ultraflotation)

Two commercial Ultraflotation plants were provided a common ultrafine impure kaolin feed. The beneficiation of the feed, utilizing one of the float plants performing at steady state conditions, established the control for the full scale experiment. The conditioned product from the other float plant was directed to a commercial 40×60 Bird solid bowl centrifuge for the purpose of comparing the two processes. The following results were obtained.

| | Bright 3/10 | TMD | Titanium, % | Iron, % |
|---|---|---|---|---|
| Control | 90.2 | 86.9 | .629 | .838 |
| #4 Bird Product | 90.4 | 87.1 | .633 | .899 |
| #5 Bird Product | 90.6 | 87.5 | .627 | .899 |

EXAMPLE 5

Hydroclone Beneficiation of Conditioned Pulp

Two different sizes of cyclones were utilized to evaluate the potential of beneficiation at a lower level of G's. The control for the experiment was the performance of the same pulp beneficiated using plant froth flotation. The following results were obtained:

| | % TMD Brightness | 3/10 B1 BR | % Titanium | % Iron |
|---|---|---|---|---|
| Control | 86.8 | 90.3 | .560 | .674 |
| Small Cyclone | 87.2 | 90.3 | .574 | .663 |
| Large Cyclone | 86.7 | 90.3 | .581 | .663 |

EXAMPLE 6

Centrifugal Beneficiation of TREP Conditioned Pulp

A TREP conditioned whole fraction kaolin crude having a particle size distribution of 61%-2 microns at nominally 35% solids was used to feed the pilot plant Sharples centrifuge to demonstrate the centrifuge beneficiation process and to achieve simultaneous fractionation to a #1 coating clay fraction. Conditioning for TREP was carried out using a squirrel cage conditioner. The following results were obtained:

| | % GE | % | % |
|---|---|---|---|

-continued

| | Brightness | Titanium | Iron |
|---|---|---|---|
| TREP Plant Feed | 82.4 | .45 | 0.3 |
| Beneficiated & Fractionated Product | 86.1 | .73 | .25 |

Final product characteristics 94-2u reduction bleached brightness potential was 89.4% at 10# bleach.

EXAMPLE 7

Ultraflotation Carrier Reuse

A laboratory study was initiated to identify the potential for recycling carrier isolated in the centrifuge beneficiation process. All the experiments utilized a total carrier loading of 15%.

With 100% fresh limestone, full reagent addition was practiced. With recycled limestone, an additional benefit was identified in that only 80–90% of the anticipated flotation reagents had to be added. This suggests that used carrier maintained an effective level of collector at an activity suitable to further beneficiate kaolin. Carrier reuse will provide cost reduction in both carrier and reagent cost. The following results were obtained:

| | % TMD Brt | % 3/10 Brt | % Titanium | % Iron |
|---|---|---|---|---|
| Experiment A | | | | |
| Control | 87.1 | 90.3 | .552 | .691 |
| Recycled Limestone | 86.6 | 89.9 | .693 | .714 |
| Experiment B | | | | |
| Control | 86.8 | 89.8 | .602 | .676 |
| Recycled Limestone | 87.9 | 89.6 | .591 | .672 |
| Experiment C | | | | |
| Control | 86.5 | 90.2 | .604 | .709 |
| Recycled Limestone | 86.8 | 90.2 | .658 | .764 |

NOTE:
All recycle experiments had 10% fresh and 5% recycled material.

It is anticipated that by practice of the process of the invention, beneficiating without utilizing the Denver flotation cells and other equipment should approach 300 horsepower or approximately 7.5 horsepower hours per ton of product.

We claim:

1. A method for purifying kaolin clay which consists essentially of the steps of:
    (a) providing degritted impure kaolin clay containing particles of a colored iron-contaminated titania impurity, said degritted impure kaolin clay being in the form of a fluid dispersed alkaline aqueous pulp and the dispersant being selected from the group consisting of alum-silica hydrosol, sodium silicate, sodium carbonate, sodium polyacrylate and mixtures thereof, said pulp being free from a phosphate dispersant;
    (b) conditioning said pulp from step (a) by agitating it in a squirrel cage mixer with calcium chloride and an anionic collector reagent comprising oleic acid capable of selectively collector-coating said iron-contaminated titania impurity;
    (c) subjecting the entirety of the conditioned pulp from step (b) to centrifugation or hydrocloning to sediment selectively collector-coated iron-contaminated impurity; and
    (d) separating said sediment from the remainder of the pulp which is a dispersed concentrate of purified kaolin.

2. The method of claim 1 wherein said dispersant is sodium silicate or an alum-silica hydrosol.

3. The process of claim 1 wherein said collector comprises oleic acid and rosin acids.

4. The process of claim 1 wherein said collector comprises oleic acid and said dispersant consists of sodium polyacrylate.

5. The process of claim 1 wherein the particle size of the purified kaolin recovered after hydrocloning or centrifugation is substantially the same as the particle size of the clay in said degritted fraction of impure kaolin before it is conditioned in said mixer.

* * * * *